United States Patent
Kita et al.

(10) Patent No.: US 11,384,818 B2
(45) Date of Patent: Jul. 12, 2022

(54) PRESSING DEVICE FOR TOROIDAL CONTINUOUSLY VARIABLE TRANSMISSION

(71) Applicants: NSK LTD., Tokyo (JP); KAWASAKI JUKOGYO KABUSHIKI KAISHA, Hyogo (JP)

(72) Inventors: Masahiro Kita, Kanagawa (JP); Kippei Matsuda, Hyogo (JP); Hideyuki Imai, Hyogo (JP); Kenichiro Tanaka, Hyogo (JP)

(73) Assignees: NSK LTD., Tokyo (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 302 days.

(21) Appl. No.: 16/763,674

(22) PCT Filed: Nov. 7, 2018

(86) PCT No.: PCT/JP2018/041349
§ 371 (c)(1),
(2) Date: May 13, 2020

(87) PCT Pub. No.: WO2019/098105
PCT Pub. Date: May 23, 2019

(65) Prior Publication Data
US 2020/0271200 A1 Aug. 27, 2020

(30) Foreign Application Priority Data
Nov. 16, 2017 (JP) .............................. JP2017-220900

(51) Int. Cl.
*F16H 15/38* (2006.01)
*F16H 57/04* (2010.01)

(52) U.S. Cl.
CPC ........... *F16H 15/38* (2013.01); *F16H 57/049* (2013.01)

(58) Field of Classification Search
CPC .............................. F16H 15/38; F16H 57/049
(Continued)

(56) References Cited

U.S. PATENT DOCUMENTS 5,027,668 A * 7/1991 Nakano ................... F16H 57/04
184/6.12
5,144,850 A * 9/1992 Hibi ......................... F16H 15/38
476/48

(Continued)

FOREIGN PATENT DOCUMENTS

JP 62-71465 U 5/1987
JP 6-147283 A 5/1994

OTHER PUBLICATIONS

International Search Report and Written Opinion dated Jan. 29, 2019, from International Application No. PCT/JP2018/041349, 6 sheets.
(Continued)

*Primary Examiner* — Ha Dinh Ho
(74) *Attorney, Agent, or Firm* — Katten Muchin Rosenman LLP

(57) ABSTRACT

A pressing device for a toroidal continuously variable transmission, comprises: a disk having a toroidal curved surface and a first cam surface; a cam plate having a cylindrical portion, and an outward facing flange portion having a second cam surface; and a plurality of rolling bodies. The cylindrical portion has a cylinder portion, a projection projecting inward in the radial direction in one axial end portion of the cylinder portion and having a step surface, and an oil supply passage. At least a part of a radial inside opening of the oil supply passage opens to a portion of the cylinder portion positioned further on the other side in the
(Continued)

axial direction than the step surface. The oil supply passage has an oil-passage hole penetrating the cylinder portion and an oil-passage groove continuous with the oil-passage hole and recessed from the step surface.

2 Claims, 4 Drawing Sheets

(58) Field of Classification Search
USPC .............................................. 476/40; 74/335
See application file for complete search history.

(56) References Cited

U.S. PATENT DOCUMENTS

| | | | |
|---|---|---|---|
| 5,651,750 A | 7/1997 | Imanishi et al. | |
| 6,176,806 B1 | 1/2001 | Okubo et al. | |
| 6,471,617 B1 * | 10/2002 | Kuhn | F16H 15/38 476/40 |
| 6,592,491 B1 | 7/2003 | Machida et al. | |
| 6,951,524 B2 * | 10/2005 | Ishikawa | F16H 15/38 476/40 |
| 8,469,856 B2 * | 6/2013 | Thomassy | F16H 15/52 476/40 |
| 2003/0130087 A1 | 7/2003 | Imanishi | |

OTHER PUBLICATIONS

The Communication pursuant to Article 94(3) EPC dated Jan. 27, 2022, from EP Application No. 18877491.3, 4 sheets.
The extended European search report dated May 3, 2021, from EP Application No. 18 87 7491, 8 sheets.

\* cited by examiner

PRESSING DEVICE FOR TOROIDAL CONTINUOUSLY VARIABLE TRANSMISSION

TECHNICAL FIELD

The present invention relates to a pressing device incorporated and used in a toroidal continuously variable transmission that is used, for example, as a generator for an aircraft or the like, an automatic transmission for various kinds of industrial machines such as a pump, or the like.

BACKGROUND ART

The toroidal continuously variable transmission has a plurality of power rollers sandwiched between an input disk and an output disk that are arranged coaxially and able to rotate relative to each other. In such a toroidal continuously variable transmission, power is transmitted from the input disk to the output disk via the power rollers. In addition, by changing the angle of inclination of the power rollers, the gear ratio between the input disk and the output disk may be adjusted. During operation of the toroidal continuously variable transmission, an oil film of traction oil is formed on a traction portion that is a rolling contact portion between the side surface in the axial direction of the input disk and the output disk and the circumferential surface of the power roller. Power that is inputted to the input disk from a drive source such as an engine or the like is transmitted to the output disk via the oil film. In a toroidal continuously variable transmission, in order to surely transmit power through such an oil film, or in other words, in order to prevent occurrence of excessive slipping called gross slipping in the traction portion, a pressing device presses the input disk and the output disk in directions approaching each other.

A loading cam type pressing device that mechanically generates a pressing force proportional to the magnitude of a transmission torque is described in Japanese Utility Model Laid-Open Publication No. S62-071465. The pressing device described in this document is configured by a plurality of rollers sandwiched between a first cam surface formed on a side surface in the axial direction of a disk, and a second cam surface formed on a side surface in the axial direction of a cam plate opposed to the first cam surface.

When the loading cam type pressing device is operated, the roller rides up on convex portions of the first cam surface and the second cam surface, causing the space in the axial direction between the first cam surface and the second cam surface to increase. Accordingly, one disk on which the first cam surface is formed is pressed toward another disk that is opposed to the one disk, and the surface pressure of the traction portion is secured.

CITATION LIST

Patent Literature

Patent Literature 1: Japanese Utility Model Laid-Open Publication No. S62-071465

SUMMARY OF THE INVENTION

Problems to be Solved by the Invention

When a loading cam type pressing device is operated, or in other words, when a pressing force is generated, the rolling surface of a roller is held between a first cam surface and a second cam surface with a strong force. Moreover, while a toroidal continuously variable transmission is operated at a constant gear ratio, the amount by which the roller rides up on convex portions of the first cam surface and the second cam surface is constant, and the roller does not roll. Therefore, when a slight slippage occurs between the rolling surface of the roller and the first cam surface and the second cam surface, there is a possibility that fretting wear will occur on the rolling surface of the roller, and the first cam surface and second cam surface. In order to prevent the occurrence of such fretting wear, it is necessary to supply a sufficient amount of lubricating oil to the contact portions between the rolling surface of the roller and the first cam surface and the second cam surface.

In order to supply a sufficient amount of lubricating oil to the contact portions between the rolling surface of the roller and the first cam surface and the second cam surface, it may be necessary depending on the shape, layout and the like of the cam plate to provide an oil supply passage for allowing the lubricating oil to pass through the plate. Lubricating oil supplied from a lubricating oil flow path provided inside a rotating shaft supporting the disk and the cam plate is supplied to the contact portions through the oil supply passage.

However, when an oil supply passage is provided in the cam plate so as to communicate with the outer-circumferential surface and the inner-circumferential surface, there is a possibility that a thin portion having a small thickness may be formed in the cam plate.

In view of the circumstances described above, an object of the present invention is to achieve a structure capable of preventing a thin portion having a small thickness from being formed in a cam plate even when an oil supply passage is provided in the cam plate.

Means for Solving the Problems

The toroidal continuously variable transmission of the present invention includes a disk, a cam plate, and a plurality of rolling bodies.

The disk has a toroidal curved surface having an arc-shaped cross section on one side surface in an axial direction, and has a first cam surface that is configured by an uneven surface in a circumferential direction on the other side surface in the axial direction.

The cam plate includes a cylindrical portion, and an outward facing flange portion that is bent outward in a radial direction from the other end portion in the axial direction of the cylindrical portion, and has a second cam surface that is configured by an uneven surface in the circumferential direction on one side surface in the axial direction facing the first cam surface.

The plurality of rolling bodies is held between the first cam surface and the second cam surface.

The cylindrical portion has a cylinder portion, a projection that is provided so as to project inward in the radial direction from an inner-circumferential surface on one end portion in the axial direction of the cylinder portion and has a step surface that faces in the other direction in the axial direction, and an oil supply passage that penetrates the cylindrical portion in the radial direction.

At least a part of an opening on an inside in the radial direction of the oil supply passage opens to a portion of the inner-circumferential surface of the cylinder portion that is positioned further on the other side in the axial direction than the step surface.

In a case of implementing the present invention, the oil supply passage may include an oil-passage hole communicating between an outer-circumferential surface and the inner-circumferential surface of the cylinder portion, and an oil-passage groove provided so as to be continuous with the oil-passage hole in the radial direction and so as to be recessed from the step surface in one direction in the axial direction.

Effect of Invention

With a toroidal continuously variable transmission of the present invention such as described above, it is possible to prevent a thin portion having a small thickness from being formed on a cam plate even in a case where an oil supply passage is provided in the cam plate.

MODES FOR CARRYING OUT THE INVENTION

First Example

Figure 1:
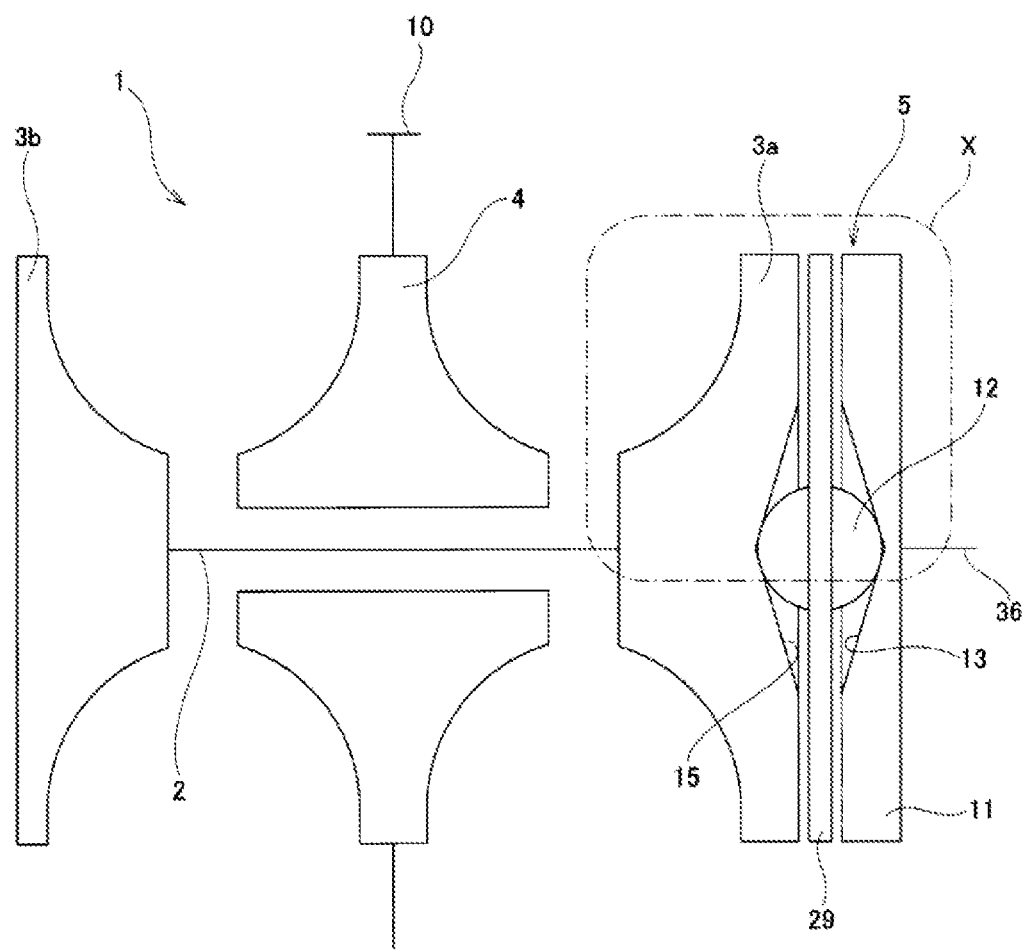
FIG. 1 is a schematic sectional view of a toroidal continuously variable transmission of a first example of an embodiment of the present invention.
Figure 2:
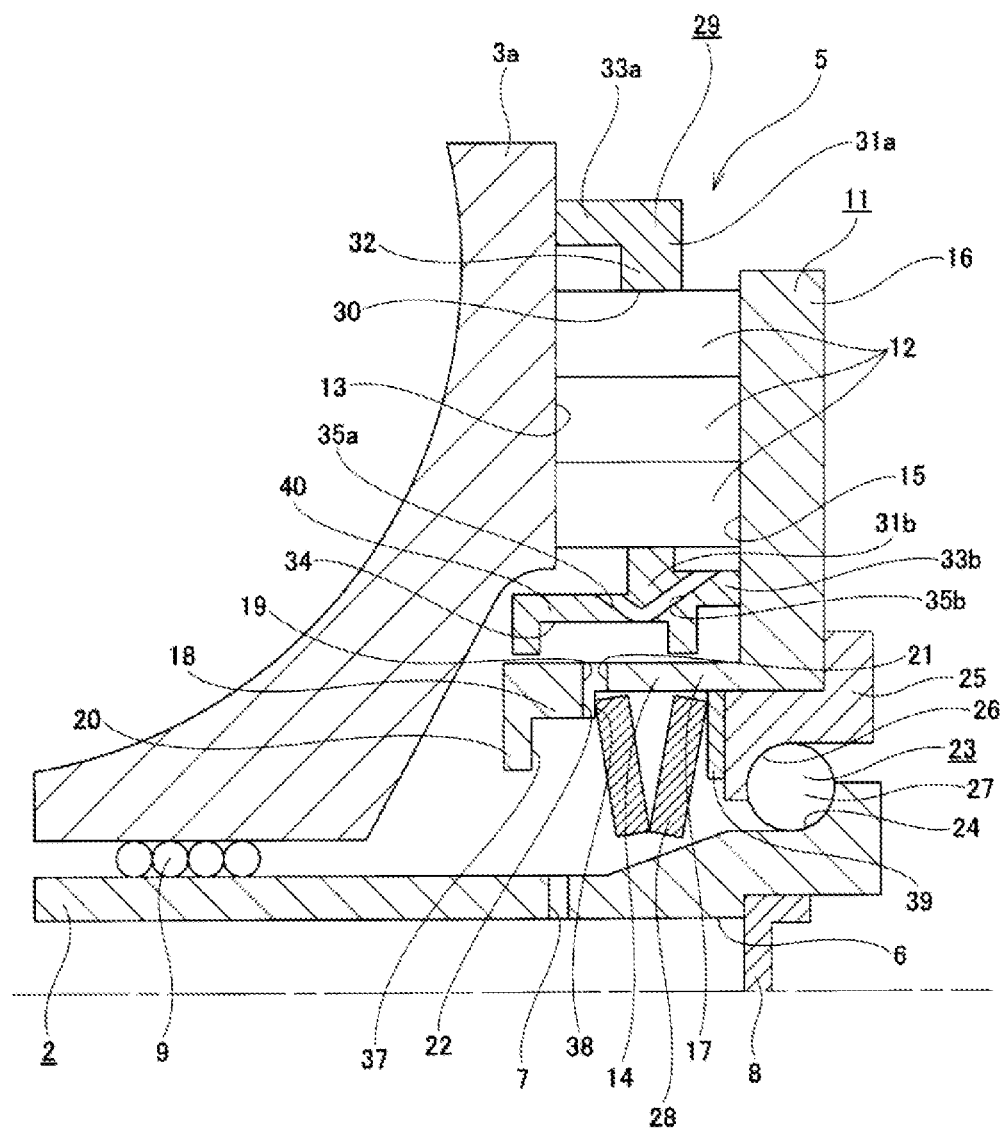
FIG. 2 is a diagram illustrating a specific structure of a portion corresponding to the X portion in FIG. 1.

FIG. 1 and FIG. 2 illustrate a first example of an embodiment of the present invention. The toroidal continuously variable transmission 1 of this example is a double cavity type that includes a rotating shaft 2, a pair of outside disks 3a, 3b each being an input disk, an inside disk 4 that is an output disk, a plurality of power rollers (not illustrated), and a pressing device 5.

The rotating shaft 2 has a lubricating oil flow path 6 penetrating the center portion in the axial direction, and a discharge port 7 that communicates with the outer-circumferential surface of the rotating shaft 2 and the lubricating oil flow path 6. In other words, the lubricating oil supplied from an oil source into the lubricating oil flow path 6 is discharged from the discharge port 7, and passes through an oil supply passage 19 and a branch hole, which will be described later, to a contact portion between the rolling surface of the roller 12, a first cam surface 13 and a second cam surface 15. Note that the discharge port 7 may be provided at only one location in the circumferential direction of the rotating shaft 2, or can be provided at a plurality of locations in the circumferential direction. Moreover, in the illustrated example, the opening portion of the lubricating oil flow path 6 is covered by a lid 8.

The pair of outside disks 3a, 3b are supported via ball splines 9 on both sides in the axial direction of the rotating shaft 2 in a state in which the side surfaces in the axial direction that are toroidal curved surfaces with an arc shaped cross section face each other. Therefore, the pair of outside disks 3a, 3b may move toward or away from each other and rotate in synchronization with the rotating shaft 2.

The inside disk 4 is provided at an intermediate portion in the axial direction of the rotating shaft 2 in a state in which both side surfaces in the axial direction that are toroidal curved surface having an arc shaped cross section are opposed to the side surfaces in the axial direction of the pair of outside disks 3a, 3b, and is rotatably supported with respect to the rotating shaft 2. The inside disk 4 has a gear 10 on the outer-circumferential surface.

The circumferential surface of each of the power rollers is held between the side surfaces in the axial direction of the pair of outside disks 3a, 3b and the both side surfaces in the axial direction of the inside disk 4 in a state in which a peripheral surface of each of the power roller that is a spherical convex surface is in rolling contact with the side surfaces in the axial direction of the pair of outside disks 3a, 3b and the both side surfaces in the axial direction of the inside disk 4. Note that, each of the power rollers is rotatably supported by a support member that is supported so as to be able to pivot around a pivot shaft that is located at a skewed position with respect to the rotating shaft 2.

The pressing device 5 is for pressing a first outside disk 3a, which is one of the pair of outside disks 3a, 3b and is a pressed disk, toward a second outside disk 3b, which is the other of the pair. In this example, the pressing device 5 is a loading cam type and includes a first outside disk 3a, a cam plate 11, a plurality of rollers 12 that are rolling bodies, and a retainer 29.

The first outside disk 3a has a toroidal curved surface having an arc-shaped cross section on one side surface in the axial direction (the left side surface in FIG. 1 and FIG. 2), and has a first cam surface 13, which is an uneven surface in the circumferential direction, on the other side surface in the axial direction (right side in FIG. 1 and FIG. 2). The first outside disk 3a is supported around the rotating shaft 2 via a ball spline 9 so as to be able to displace in the axial direction relative to the rotating shaft 2, and so as to be able to rotate in synchronization with the rotating shaft 2.

The cam plate 11 has a substantially L-shaped cross section, includes a cylindrical portion 14, and an outward facing flange portion 16 that is bent outward in the radial direction from the other end portion in the axial direction of the cylindrical portion 14 and has a second cam surface 15 on one side surface in the axial direction that faces the first cam surface 13.

The cylindrical portion 14 includes a cylinder portion 17, a projection 18, and an oil supply passage 19. The projection 18 is provided around the entire circumference so as to protrude inward in the radial direction from the inner-circumferential surface at one end portion in the axial direction of the cylinder portion 17. The other side surface in the axial direction of the projection 18 is a step surface 38 facing in the other direction in the axial direction. In other words, the inner circumferential surface of an intermediate portion in the axial direction of the cylinder portion 17 and the inner-circumferential surface of the projection 18 are connected by the step surface 38. In addition, the projection 18 has an inward facing flange portion 20 at one end portion in the axial direction, and projects further inward in the radial direction than a portion adjacent to the other side in the axial direction. Note that it is not always necessary to provide such a projection 18 around the entire circumference. In other words, the projection may be configured to have a discontinuous portion, or may be configured to include protrusions provided at a plurality of positions in the circumferential direction.

The oil supply passage 19 is provided in a radial manner at at least one position (preferably a plurality of positions) in the circumferential direction of an intermediate portion in the axial direction of the cylindrical portion 14 so as to penetrate the cylindrical portion 14 in the radial direction.

Each of the oil supply passages 19 has an oil-passage hole 21 that communicates between the outer-circumferential surface and the inner-circumferential surface of the cylinder portion 17, and an oil-passage groove 22 provided on the step surface 38 so as to be continuous with the oil-passage hole 21 in the radial direction, and to be recessed in one direction in the axial direction. In the present example, the oil-passage hole 21 and the oil-passage groove 22 of each oil supply passage 19 are present on the same cylindrical surface. In other words, the oil-passage hole 21 is formed as a circular hole, and the oil-passage groove 22 is formed having an arc-shaped cross section.

Note that the oil supply passage is not limited to the above-described configuration, and various configurations may be adopted. More specifically, for example, the oil-passage hole and the oil-passage groove of the oil supply passage may be present on the same conical surface having an inside diameter that increases toward the outside in the radial direction. Alternatively, for example, the oil-passage hole of the oil supply passage may be a rectangular hole, and the oil-passage groove may have a rectangular cross section. Moreover, in this example, the oil supply passage 19 is provided in the radial direction; however, the oil supply passage 19 may be provided in a direction in which the oil supply passage 19 is inclined in a direction toward one or the other in the axial direction toward the outside in the radial direction.

The cam plate 11 is supported at an end portion of the rotating shaft 2 via a support bearing 23 so as to be rotatable with respect to the rotating shaft 2. In this example, the support bearing 23 is of an angular type, and a plurality of balls 27 are arranged between an inner raceway 24 formed on the outer-circumferential surface of the end portion of the rotating shaft 2 and an outer raceway 26 formed on the inner-circumferential surface of the outer ring 25 so as to be able to roll freely. The outer race 25 is fitted inside the other end portion in the axial direction of the cylindrical portion 14 of the cam plate 11 so as to be able to transmit power and so that relative displacement in the axial direction is possible. More specifically, for example, the outer-circumferential surface of the outer ring 25 and the inner-circumferential surface of the other end portion in the axial direction of the cylindrical portion 14 engage by a spline engagement.

Moreover, a disc spring 28 and a spacer 39 are sandwiched between one side surface in the axial direction of the outer ring 25 and the other side surface in the axial direction of the projection 18. The cam plate 11, the roller 12, and the first outside disk 3*a* are pressed toward the one side in the axial direction by the disc spring 28, and at the same time, the rotating shaft 2 and the second outside disk 3*b* are pulled toward the other side in the axial direction. With such a configuration, even when the rotating shaft 2 is stopped, the surface pressure of a traction portion, which is a rolling contact portion between the circumferential surface of the power roller and one side surface in the axial direction of the pair of outside disks 3*a*, 3*b* and the both side surfaces in the axial direction of the inside disk 4 may be maintained at the minimum required pressure. Therefore, the traction portion may start power transmission immediately after the start of operation of the toroidal continuously variable transmission 1 without the occurrence of excessive slippage.

Each roller 12 has a short columnar shape with a dimension in the axial direction that is shorter than the diameter dimension. Each roller 12 is such that the rolling surface that is the outer-circumferential surface is brought into rolling contact with the first cam surface 13 and the second cam surface 15, and is held between the first cam surface 13 and the second cam surface 15. In this example, the rollers 12 are such that every set number of rollers (every three rollers in the illustrated example) are combined in a series, and in this state, are rotatably arranged inside pockets 30 that are arranged at a plurality of locations in the circumferential direction of the retainer 29. Each of the rollers 12 that are combined in series may rotate independently, so it is possible to absorb a speed difference between the inner diameter sides and the outer diameter sides of the first cam surface 13 and the second cam surface 15.

The retainer 29 has a ring shape as a whole and includes a pair of rim portions 31*a*, 31*b* arranged coaxially with each other, and a plurality of column portions 32 that span between the pair of rim portions 31*a*, 31*b*. Each of the portions surrounded on four sides by the pair of rim portions 31*a*, 31*b* and a pair of column portions 32 adjacent in the circumferential direction is a pocket 30 for rotatably holding the rollers 12.

Of the pair of rim portions 31*a*, 31*b*, the rim portion 31*a* on the outer diameter side has a protruding portion 33*a* that protrudes over the entire circumference further toward the one side in the axial direction than the column portion 32. On the other hand, of the pair of rim portions 31*a*, 31*b*, the rim portion 31*b* on the inner diameter side has a protruding portion 33*b* that protrudes over the entire circumference further toward the other side in the axial direction than the column portion 32, and a projecting portion 40 protruding over the entire circumference further toward the one side in the axial direction than the column portion 32. In the present example, the protruding portion 33*a* on the outer diameter side engages with the first cam surface 13, and the protrusion 33*b* on the inner diameter side engages with the second cam surface 15, making it possible to position the retainer 29 in the axial direction. On the other hand, the rim portion 31*b* on the inner diameter side is externally fitted to the cylindrical portion 14 of the cam plate 11 with a clearance fit, and the inner-circumferential surface of the rim portion 31*b* on the inner diameter side and the outer-circumferential surface of the cylindrical portion 14 are brought into close proximity to each other, and by opposing each other, it is possible to position the retainer 29 in the radial direction.

The rim portion 31*b* on the inner diameter side has an oil retaining recess portion 34 on the outer diameter side and a plurality of supply holes 35*a*, 35*b*. The oil retaining recess portion 34 on the outer diameter side is provided around the entire circumference of the inner-circumferential surface of a portion of the rim portion 31*b* on the inner diameter side that spans from an intermediate portion in the axial direction existing on the inner diameter side of the column portion 32 to the projecting portion 40 so as to face the opening on the outer diameter side of the oil-passage hole 21 that is open on the outer-circumferential surface of the cylinder portion 17. Note that the oil retaining recess portion 34 on the outer diameter side has a width dimension sufficient so as to always be capable of facing the opening on the outer diameter side of the oil-passage hole 21 in the radial direction regardless of the riding up position of the roller 12 on the first cam surface 13 and the second cam surface 15.

The supply holes 35*a*, 35*b* are formed in pairs in portions of the rim portion 31*b* on the inner diameter side so that the phase in the circumferential direction coincides with that of the pockets 30. Of each pair of supply holes 35*a*, 35*b*, one supply hole 35*a* is formed in a direction toward the one side in the axial direction while going outward in the radial direction, and the opening on the inner diameter side opens to the bottom surface of the oil retaining recess portion 34 on the outer diameter side, and the opening on the outer diameter side opens to the outer-circumferential surface of the projecting portion 40. On the other hand, each of the other supply holes 35b is formed in a direction toward the other side in the axial direction while going toward the outside in the radial direction, and the opening on the inner diameter side opens to the bottom surface of the oil retaining recess portion 34 on the outer diameter side, and the opening on the outer diameter side opens to the outer-circumferential surface of the protruding portion 33b on the inner diameter side.

During operation of the toroidal continuously variable transmission 1 having the configuration described above, the cam plate 11 of the pressing device 5 is rotationally driven by a drive source such as an engine, a motor, or the like via a drive shaft 36. When the cam plate 11 is rotationally driven, each of the rollers 12 rides up on convex portions of the first cam surface 13 and the second cam surface 15 so as to become strongly held between the first cam surface 13 and the second cam surface 15. In addition, the rotation of the cam plate 11 is transmitted to the first outside disk 3a via an engagement portion between the rolling surface of each roller 12 and the first cam surface 13 and the second cam surface 15. As a result, each of the pair of outside disks 3a, 3b rotates in synchronization with each other while being pressed toward each other. The rotation of the pair of outside disks 3a, 3b is transmitted to the inside disk 4 via the power rollers, and the rotation of the inside disk 4 is obtained from the gear 10.

Note that in a case of changing the gear ratio between the pair of outside disks 3a, 3b and the inside disk 4, the support members supporting the power rollers are displaced in the axial direction of the pivot shaft. This changes the direction of the force in the tangential direction acting on the traction portion. When the direction of the force in the tangential direction acting on the traction portion changes, the support member swings about the pivot shaft, and the positions of contact between the circumferential surface of the power roller, the one side surface in the axial direction of each of the pair of outside disks 3a, 3b, and the both side surfaces in the axial direction of the inside disk 4 changes. In this example, in a case where the circumferential surface of each of the power rollers is brought into rolling contact with the outside portion in the radial direction of each of the pair of outside disks 3a, 3b and the inside portions of the inside disk 4, the gear ratio of the toroidal continuously variable transmission 1 is on the speed increasing side. On the other hand, in a case where the circumferential surface of each power roller is brought into rolling contact with the inside portion in the radial direction of each of the pair of outside disks 3a, 3b and the outside portions of the inside disk 4, the gear ratio of the toroidal continuously variable transmission is changed to the decreasing speed side.

Moreover, lubricating oil that is supplied into the lubricating oil flow path 6 of the rotating shaft 2 is discharged from the discharge port 7 by centrifugal force caused by the rotation of the rotating shaft 2. The lubricating oil discharged from the discharge port 7 is held in the oil retaining recess portion 37 on the inner diameter side defined by the inner-circumferential surface of the other side in the axial direction of the projection 18, the other side surface in the axial direction of the inward facing flange portion 20, and one side surface in the axial direction of the disc spring 28. The lubricating oil in the oil retaining recess portion 37 on the inner diameter side is taken into the oil supply passage 19 from the oil-passage groove 22, is discharged from the opening on the outer diameter side of the oil-passage hole 21 toward the oil retaining recess portion 34 on the outer diameter side of the retainer 29, and is held in the oil retaining recess portion 34 on the outer diameter side. Then, the lubricating oil in the oil retaining recess portion 34 on the outer diameter side is discharged toward the contact portions between the rolling surface of the roller 12, and the first cam surface 13 and the second cam surface 15 via the supply holes 35a, 35b, and lubricates the contact portions. Accordingly, the occurrence of fretting wear on the rolling surface of the roller 12, the first cam surface 13 and the second cam surface 15 is prevented.

Figure 3:
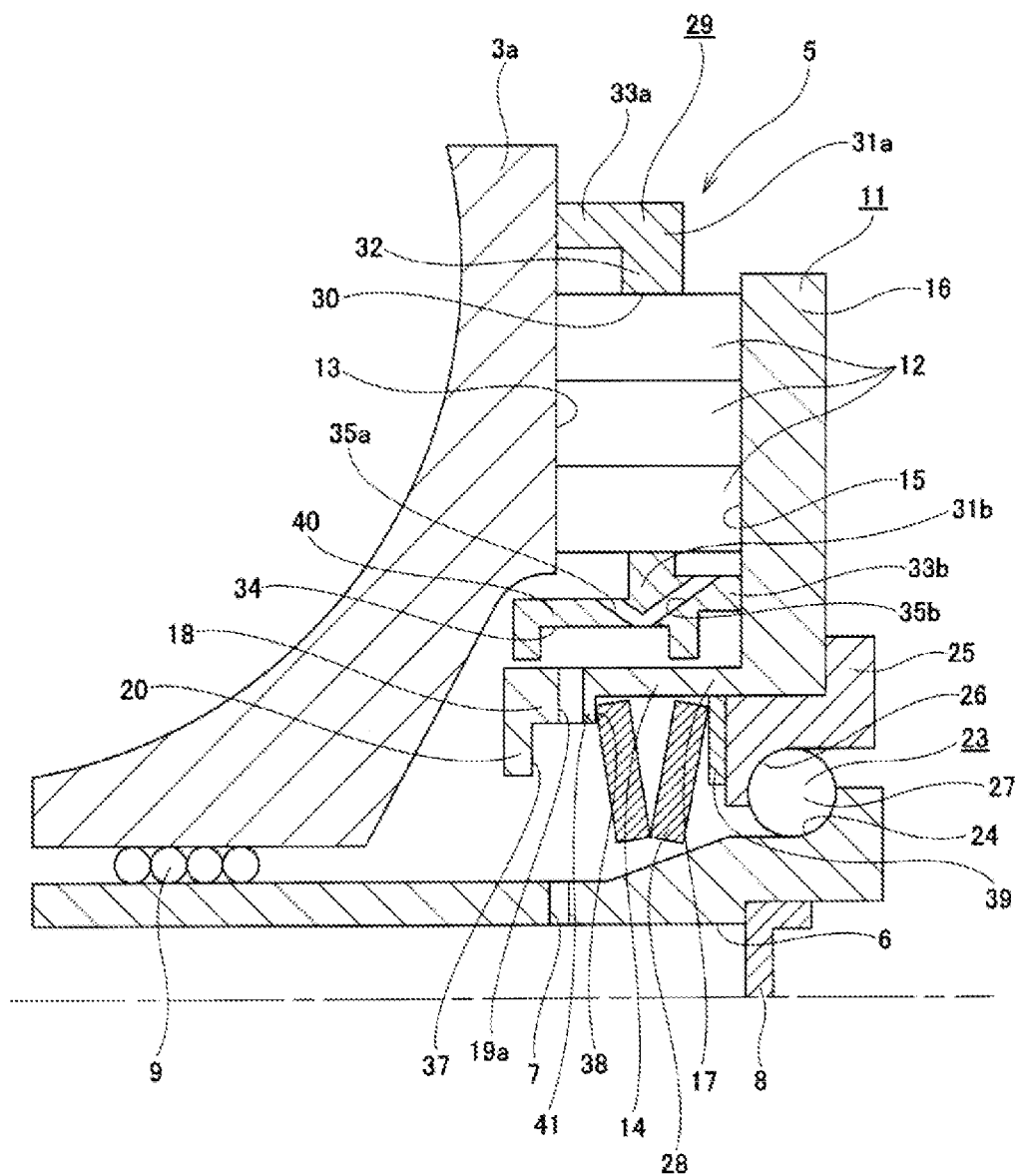
FIG. 3 is a view similar to FIG. 2, and illustrates a structure of a comparative example of the present invention.

In the toroidal continuously variable transmission 1 of the present example, each of the oil supply passages 19 in the cam plate 11 includes an oil-passage hole 21 that communicates between the outer-circumferential surface and the inner-circumferential surface of the cylinder portion 17, and an oil-passage groove 22 provided so as to be continuous in the radial direction with the oil-passage hole 21, and so as to be recessed in the one direction in the axial direction from the step surface 38, and providing the oil supply passage 19 prevents the cam plate 11 from having a thin portion having a small thickness. On the other hand, in the comparative example illustrated in FIG. 3, the oil supply passage 19a is a through hole having an inner end portion in the radial direction that opens to the inner-circumferential surface of the projection 18 and an outer end portion in the radial direction that opens to the outer-circumferential surface of the cylinder portion 17. Therefore, a portion of the projection 18 of the cam plate 11 existing further on the other side in the axial direction than the oil supply passage 19a is a thin portion 41 having a small thickness. In the present example, the thin portion having a small thickness does not exist in the cam plate 11, so the strength of the cam plate 11 may be increased as compared with the structure of the comparative example illustrated in FIG. 3. Moreover, even in a case where the cam plate 11 is subjected to a heat treatment such as quenching or the like, it is possible to prevent the occurrence of cracking or the like in the cam plate 11.

Note that in this example, a case has been described in which the pair of outside disks 3a, 3b are input disks that are rotationally driven by a drive source, and the inside disk 4 is an output disk; however, in implementing the present invention, the inside disk may be an input disk and a pair of outside disks may be output disks. Moreover, in a toroidal continuously variable transmission in which the pressing device of the present invention is incorporated, a structure of a half toroidal type or a full toroidal type may be adopted. Furthermore, a toroidal continuously variable transmission in which the pressing device of the present invention is incorporated is not limited to the double cavity type, but may be a single cavity type.

Example 2

Figure 4:
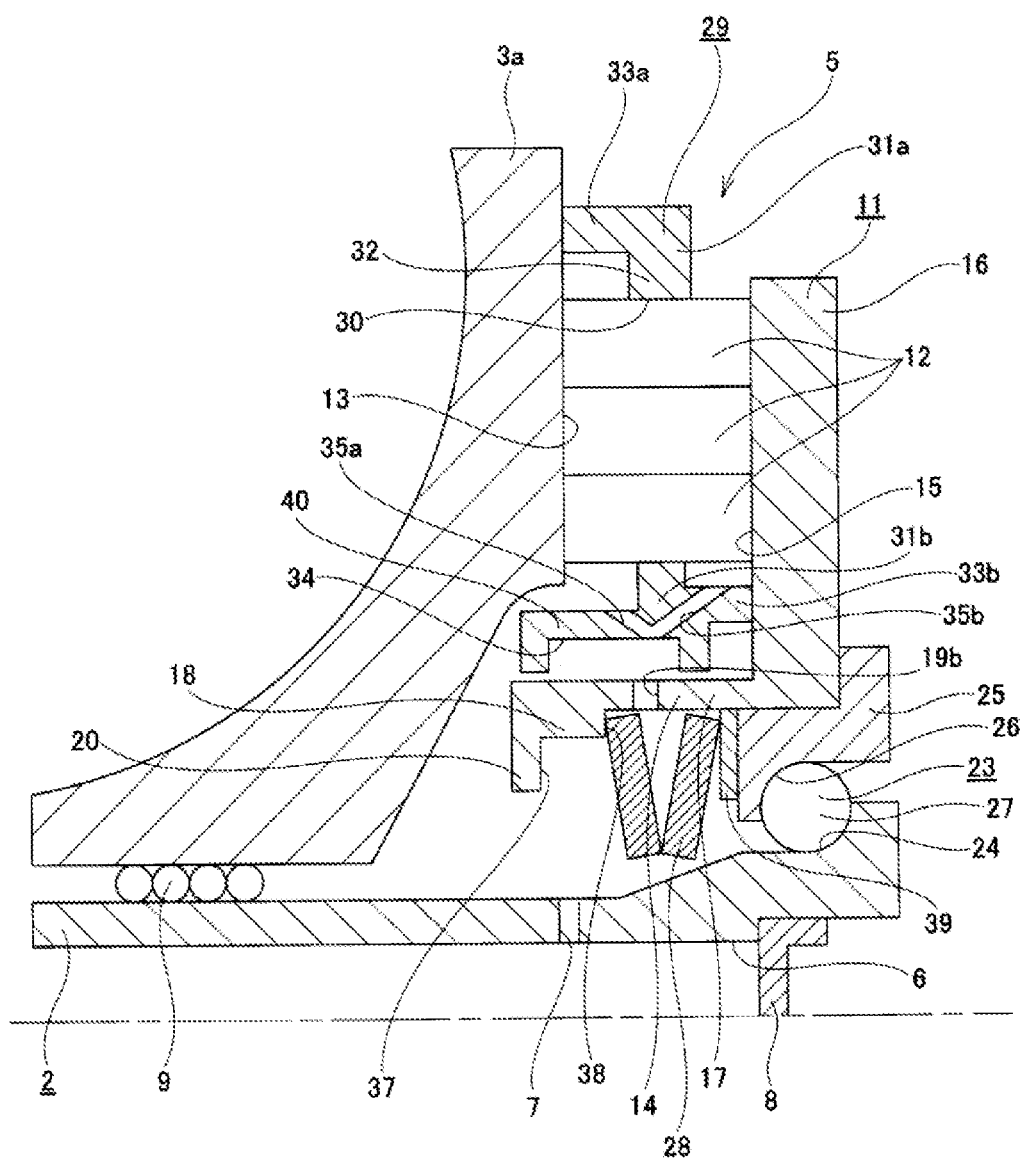
FIG. 4 is a view similar to FIG. 2, and illustrates a second example of an embodiment of the present invention.

FIG. 4 illustrates a second example of an embodiment of the present invention. In this example, the entire opening on the inside in the radial direction of the oil supply passage 19b is opened to a portion of the cylinder portion 17 of the cylindrical portion 14 that is located further on the other side in the axial direction (the right side in FIG. 4) than the step surface 38. In other words, the oil supply passage 19b is provided so as to penetrate in the radial direction a portion of the cylinder portion 17 located further on the other side in the axial direction than the step surface 38. In the case of this example as well, the cam plate 11 may be made so that there is no thin portion with a small thickness, and the strength of the cam plate 11 may be increased compared with the structure of the comparative example illustrated in FIG.

3. The configuration, operation and effect of the other parts are the same as those of the first example.

REFERENCE SIGNS LIST

1 Toroidal continuously variable transmission
2 Rotating shaft
3a, 3b Outside disk
4 Inside disk
5 Pressing device
6 Lubricating oil flow path
7 Discharge port
8 Lid
9 Ball spline
10 Gear
11 Cam plate
12 Roller
13 First cam surface
14 Cylindrical portion
15 Second cam surface
16 Outward facing flange portion
17 Cylinder portion
18 Projection
19, 19a, 19b Oil supply passage
20 Inward facing flange portion
21 Oil-passage hole
22 Oil-passage groove
23 Support bearing
24 Inner raceway
25 Outer ring
26 Outer raceway
27 Ball
28 Disc spring
29 Retainer
30 Pocket
31a, 31b Rim portion
32 Column portion
33a, 33b Protruding portion
34 Outer diameter side oil retaining recess portion
35a, 35b Supply hole
36 Drive shaft
37 Inner diameter side oil retaining recess portion
38 Step surface
39 Spacer
40 Projecting portion
41 Thin portion

The invention claimed is:

1. A pressing device for a toroidal continuously variable transmission, comprising:
   a disk having a toroidal curved surface having an arc-shaped cross section on one side surface in an axial direction, and having a first cam surface configured by an uneven surface in a circumferential direction on an other side surface in the axial direction;
   a cam plate including a cylindrical portion, and an outward facing flange portion bent outward in a radial direction from an other end portion in the axial direction of the cylindrical portion, and having a second cam surface configured by an uneven surface in the circumferential direction on one side surface in the axial direction facing the first cam surface; and
   a plurality of rolling bodies held between the first cam surface and the second cam surface;
   the cylindrical portion having a cylinder portion, and a projection provided so as to project inward in the radial direction from the inner-circumferential surface on one end portion in the axial direction of the cylinder portion, and having a step surface facing in an other direction in the axial direction, and an oil supply passage penetrating the cylindrical portion in the radial direction; and
   at least a part of an opening on an inside in the radial direction of the oil supply passage opening to a portion of the inner-circumferential surface of the cylinder portion positioned further on an other side in the axial direction than the step surface.

2. The pressing device for a toroidal continuously variable transmission according to claim 1, wherein
   the oil supply passage has an oil-passage hole communicating between an outer-circumferential surface and the inner-circumferential surface of the cylinder portion, and an oil-passage groove provided so as to be continuous with the oil-passage hole in the radial direction and so as to be recessed from the step surface in one direction in the axial direction.

* * * * *